United States Patent [19]

Nickel

[11] Patent Number: 5,034,227
[45] Date of Patent: Jul. 23, 1991

[54] PROCESS FOR PREPARING PRODUCTS FROM LEGUMES

[75] Inventor: Gary B. Nickel, Winnipeg, Canada

[73] Assignee: James Richardson & Sons Limited, Winnipeg, Canada

[21] Appl. No.: 201,741

[22] Filed: Jun. 3, 1988

Related U.S. Application Data

[62] Division of Ser. No. 42,631, May 25, 1979.

[30] Foreign Application Priority Data

Jun. 2, 1978 [CA] Canada .................................. 304709

[51] Int. Cl.$^5$ ...................... A61K 37/78; A23L 1/20; A23L 1/28
[52] U.S. Cl. ................................ 424/195.1; 426/484; 426/634; 426/655; 530/378
[58] Field of Search ..................... 530/378; 424/195.1, 424/484, 634, 655

[56] References Cited

U.S. PATENT DOCUMENTS 3,261,822 7/1966 Robbins et al. ..................... 530/378
4,169,090 9/1979 Murray et al. ..................... 530/378

OTHER PUBLICATIONS

Koshiyama, Y. et al, "Soybean 7S Protein", Chem. Abst. vol. 88, 1978: 20838z p. 469.
Webster's II, New Riverside University Dictionary, The Riverside Publishing Co. 1984, p. 735.
Nakagaki "Odorless Soybean Protein", Chem. Abst., vol. 88, 1978: 20839a, p. 469.
Kirk-Othmer Encyclopedia of Chemical Technology, vol. 18, p. 601, p. 605.
Donald K. Dubois, The Practical Application of Fiber Materials in Bread Production; Apr. 1978; The Bakers Digest; pp. 30-33.
Dr. Pomeranze et al., Fiber in Breadmarking-Effects on Functional Properties; 1977; American Association of Cereal Chemists, Inc. pp. 25-41.
N. Prentice et al.; High-Fiber Bread Containing Brewer's Spent Grain; Sep.-Oct. 1977; American Association of Cereal Chemists; pp. 1084-1095.
N. Prentice et al.; High-Fiber Cookies Containing Brewer's Spent Grain; 1978 The American Association of Cereal Chemist; pp. 712-721.
Diane L. Vratanina et al.; Dietary Fiber Sources for Baked Products: Bran in Sugar-Snap Cookies; 1978 Journal of Food Science; pp. 1590-1594.

Primary Examiner—Lester L. Lee
Assistant Examiner—Choon Koh
Attorney, Agent, or Firm—Burns, Doane, Swecker & Mathis

[57] ABSTRACT

A process for preparing products from legumes which comprises preparing an aqueous suspension containing finely ground seed from peas or beans, at a pH within the range of about 2.0 to 10.0, subjecting the suspension to one or more centrifugation operations and isolating therefrom at least one product containing essentially the protein content of the seed and another product containing essentially the starch content of the seed. A good quality fibrous by-product may also be isolated. The products are useful in the food industry.

14 Claims, No Drawings

PROCESS FOR PREPARING PRODUCTS FROM LEGUMES

This application is a divisional of application Ser. No. 042,631 filed May 25, 1979.

This invention relates to a process for preparing products from legumes and more particularly it relates to a process for the separation of one or more protein products and one or more carbohydrate products from legumes such as peas and beans. These protein and carbohydrate products are useful in the food processing industry, for example as additives to food preparations, or in other industries such as the paper industry and the pharmaceutical industry. A useful by-product of the process is good quality fibrous material which can be used in the food processing industry.

It is known that dry legumes such as dry field peas, faba beans and white pea beans have a protein content ranging from about 21% to about 31% and a starch or carbohydrate content ranging from about 43% to about 53%. It is often desirable to separate the protein content from the starch content in such legumes, as far as is possible, in order to provide a protein product relatively high in protein content and a starch product which is relatively low in undesired impurities.

It has now been found that by operating the process of the present invention, it is possible to separate essentially the protein content from the starch or carbohydrate content of legumes such as peas an.d beans, and thus prepare protein products and starch products. During operation of this process, the desired products are prepared under conditions such that enzymatic activity is substantially inhibited, or is maintained at a relatively low level, thereby minimizing the development of odour or flavour in the prepared products.

The invention as claimed herein is a process for the preparation of a novel protein product or a novel starch product from legume seed which comprises suspending finely ground or powdered legume seed in an aqueous medium to provide an aqueous suspension wherein the pH is within the range of from about 2.0 to about 10.0, subjecting said aqueous suspension to centrifugation to provide an overflow fraction containing a major proportio of proteins and an underflow fraction containing a major proporti of starches, and thereafter adjusting the pH of said overflow fraction and isolating therefrom a protein product, or adjusting the pH of said underflow fraction and isolating therefrom a starch product.

The legume seed used as starting material for the above process may be peas or beans, or a mixture of said peas and beans. A preferred starting material is yellow field peas and suitable varieties of peas are Trapper, Century, Flavo, Victoria and First & Best, while suitable varieties of beans are Diana and Ackerperle.

The starting material in the form of an aqueous suspension containing finely ground or powdered legume seed may be prepared in any manner suitable for, or convenient for, the handling of such legume seed. Thus, for example, the seed, which may or may not have been subjected to a preliminary treatment to reduce the moisture content thereof, may be finely ground, in the dry state, by the use of dry milling equipment. The powder or flour so obtained may then be suspended in an aqueous medium at the appropriate pH to provide the required aqueous suspension.

The peas and beans used to provide powdered starting material are generally received with hulls intact, sometimes associated with field chaff or other unwanted products from the area where they are grown. These peas and beans usually have a moisture content of about 14% to 16% and they may be cleaned in the usual cleaning equipment and optionally dried at the same time to reduce the moisture content to a figure of about 10% to facilitate the removal of the hulls by means of suitable dehulling equipment, for example commercially available equipment incorporating discs or rollers. At this point, the starting material being prepared is in the form of clean, dehulled seed, optionally having a reduced moisture content, which contains as its major components, starches, proteins, sugars and a certain amount of fibre.

The clean, dehulled seeds are then ground into a powder or flour and such grinding may be carried out by a dry milling procedure, for example using a high energy mill, to produce a flour which will permit relatively easy dispersion in water. A flour having a particle size no greater than about 120 microns is generally satisfactory for use in the process of the present invention.

The powder or flour from the ground seed may be suspended in a chemically treated aqueous medium at ambient temperature, for example at about 15° C to 25° C, and the ratio of water to flour may conveniently be from about 3:1 to about 10:1 by weight. The aqueous medium may contain an acid or an alkali, or an appropriate salt thereof, in order to provide a pH within the desired range of about 2.0 to about 10.0. The aqueous medium may contain, for example, hydrochloric acid, phosphoric acid or sodium hydroxide. The aqueous suspension so obtained, in the form of a fine aqueous dispersion or slurry, is preferably rapidly stirred or agitated during the thorough mixing to provide a suspension having a pH within the range of about 2.0 to about 10.0 using an acid or an alkali or an alkaline salt, as the case may be, according to the pH required. An alkaline salt used to achieve the desired pH of the aqueous suspension may be, for example, sodium pyrophosphate, sodium trimetaphosphate, sodium tripolyphosphate, sodium tetrametaphosphate or sodium bisulphite.

It is preferred that the pH of the aqueous suspension be within the range of about 2.2 to about 3.2 and more particularly within the range of about 2.5 to 3.0. This may be achieved by the addition of an acid such as hydrochloric acid. It is preferred that the water be preacidified prior to the introduction of the legume powder or flour so that the flour is thus added to an acidulated aqueous medium in order to ensure proper mixing and distribution of the flour throughout the aqueous slurry, thereby avoiding local concentration of acid which may degradate or affect the proteins present in the flour. A pH lower than about 3.0 is preferred because operation of the process at such a lower pH is associated with relatively low enzymatic activity and therefore reduced odour or flavour development in the products isolated during subsequent processing. Operation of the process at low pH levels, for example at a pH of about 2.5 to 3.0, provides a method of controlling and minimizing the development of characteristic off-flavours, generally referred to or described as "beaniness", in the protein isolate product obtained from the process. Adequate stirring or mixing at this initial stage may be brought about by the use of continuous in line mixing devices or equipment. By operation at.this relatively low pH of about 2.5 to 3.0, it is generally found that about 50% by weight of the proteins present in the original flour may be in solution in the aqueous suspension. It is to be understood that by operating at higher pH ranges, for example in the range of pH about 6.5-9.5, the amount of protein in solution in the aqueous suspension tends to vary according to the means and conditions used to obtain and maintain the pH of the aqueous suspension. Increasing the pH of the suspension tends to increase enzymatic activity thus leading to certain flavour or odour development. The process may nevertheless be operated at such high pH ranges where such flavour or odour development is not unacceptable in the protein products isolated from the process.

It will be appreciated that the aqueous suspension containing legume seed in a finely divided state, to be used as starting material, may alternatively, be obtained by means of a wet grinding procedure whereby the seed is ground in an aqueous the desired pH of the aqueous suspension. The wet grinding procedure may be carried out in any kind of wet grinding equipment, for example in a Bauer type plate grinder, in an aqueous medium, such as acidulated water containing hydrochloric acid, whereby an aqueous suspension is obtained containing finely divided legume seed in the form of an aqueous slurry at the desired pH for subsequent processing.

The aqueous suspension obtained from the dry milling procedure or the wet grinding procedure at the desired pH is in the form of an aqueous slurry or fine dispersion which may be screened or filtered at one or more stages of the processing operation in order to remove fibrous material If the aqueous slurry has been produced by means of a wet grinding procedure, for example using yellow field.pea seed (split peas) in an acidulated aqueous medium containing hydrochloric acid, the solution may first be screened to remove as much as possible of the fibrous material. Such screening may be carried out by passage of the aqueous slurry through a suitable screening device such as a vibratory screen, filter press, a rotary vacuum filter, a centrifugal separator or an ultrafiltration membrane. The former filter and screens, the latter membrane may retain some starches and fibrous material while other starches and proteins pass through and the fibrous material can subsequently be separated from the starches.

The screened aqueous suspension, as a slurry or fine dispersion, containing a substantial proportion of proteins in solution, is then subjected to centrifugal action to separate the mixture into a so-called liquid fraction and a solid fraction. A suitable decanter or horizontal type centrifuge, such as a Sharples Pennwalt Series P super decanter centrifuge, or a series of hydroclones, such as a Dorr Oliver hydroclone, may be used. As a result of this centrifugal action, there is obtained a low solids content overflow portion, a so-called liquid fraction, containing essentially soluble proteins with some sugars, and a high solids content underflow portion, a so-called solid fraction, containing essentially insoluble starches with some insoluble proteins, and fibrous material The said overflow portion or liquid fraction containing essential soluble proteins with some sugars may then be further treated in order to obtain therefrom the desired proteins. If this liquid fraction contains an appreciable amount of insoluble solid material, it may be advantageous to subject it to an additional centrifugation operation in order to remove a solid underflow portion containing solids, such as fibrous material, degraded starches and solid proteins, while providing an overflow liquid fraction rich in dissolved proteins. If the liquid fraction, with or without additional centrifugation, is at a relatively low pH, preferably within the range of about 2.0 to about 3.0 and especially within the range of about 2.5 to about 3.0, it is generally advisable to increase the pH thereof to a figure of between about 4.4 to 4.6. If the liquid fraction is, however, already at a high pH, for example at a pH of about 8.5 to about 9.5, it will be necessary to lower the pH thereof to a figure of between about 4.4 to 4.6. This figure is known as the isoelectric point for proteins and it is the point where a majority of the proteins coagulate and are precipitated from solution. Any adjustment of pH may be carried out by the addition of a dilute aqueous solution of an acid, such as hydrochloric acid, or an alkali, such as sodium hydroxide. The proteins are thereby coagulated and begin to precipitate. The solid protein so obtained may be removed from the soluble sugars remaining in solution by use of a suitable centrifuge, such as a desludging type of centrifuge commercially available as a Westphalia or DeLaval centrifuge. The solid fraction in the form of a sludge containing solid proteins so isolated may, if desired, be further treated by dispersing the sludge in about 3 to 5 parts of water to form an aqueous slurry and thereafter adding acid, for example hydrochloric acid, as necessary, to maintain an aqueous slurry of about pH 4.4 to 4.6. The slurry is again centrifuged to obtain a solid fraction which is essentially proteins substantially free from sugars and relatively free from odour and flavour.

The high solids content underflow portion, the so-called solid fraction, containing essentially insoluble starches with some insoluble proteins, mentioned above, may be further created in order to separate the starches from the remaining proteins and thus obtain a starch product. This solid fraction may conveniently be slurried in pretreated water to provide an aqueous slurry having a pH within the range of about 8.5 to about 9.5. The pretreated water may contain an alkali such as sodium hydroxide. The adjustment in pH is generally sufficient to bring about solubilization of the remaining proteins such that the aqueous alkaline slurry now consists of a solid phase containing essentially starches and a liquid phase containing essentially proteins. This aqueous slurry may conveniently be separated by centrifugation using a centrifuge such as that referred to above as a decanter or horizontal type of centrifuge, available as a Sharples Pennwalt Series P super decanter centrifuge, or a series of hydroclones, such as a Dorr Oliver hydroclone. Such separation provides a liquid fraction containing essentially soluble proteins and a solid fraction containing essentially insoluble starches with possibly small amounts, of the order of about 1% to about 1.5%, of proteins. This solid fraction may be retreated by further slurrying in water with adjustment of the pH of the aqueous slurry to within the range of about 4 to about 7, separating and washing to provide a solid fraction which is essentially starches with relatively little protein present, the protein content being down as low as 0.5%.

The liquid fraction or fractions from this separation procedure contains essentially soluble proteins and any insoluble solid material therein may be removed by means of an additional centrifugation operation to separate fibrous material, degraded starches or insoluble proteins. The liquid fraction thus remaining is generally at a pH within, the range of about 8.0 to about 9.5 and therefore requires adjustment of the pH to a figure of about 4.4 to 4.6 (isoelectric point) in order to coagulate and precipitate proteins. This may be achieved by the addition of an acid, such as hydrochloric acid, in order to adjust the liquid fraction to a pH of about 4.4 to 4.6. At this point, the proteins coagulate and precipitate into a solid form. This solid form of proteins may conveniently be separated from the remaining soluble sugars by subjecting the mixture to centrifugation, for example by use of a desluding type of centrifuge commercially available as a Westphalia or DeLaval centrifuge. The solid protein portion thus obtained can be retreated, if desired, by reslurrying in 3-5 parts water with adjustment of the pH again to a figure of about 4.4 to 4.6. After further centrifugation, the solid protein product so obtained consists essentially of proteins with little or no sugars and is relatively free from odour or flavour.

The two protein products obtained from the process described above may be dried independently or they may be combined and dried as a single protein product. If dried separately, the first protein product has a very low flavour and when dried in a spray type dryer at low temperature, it provides a protein powder which is extremely soluble in water. The second protein product, when dried in a spray type dryer at low temperature, provides a second protein powder characterized by high water absorption and oil emulsification properties.

Alternatively, the two protein fractions, in the form of their so-called liquid protein fractions, may be combined into a single liquid protein fraction which can then be adjusted to a pH of about 4.4 to 4.6, (the isoelectric point), and the proteins thereby coagulate and precipitate. This combined protein product can then be separated and retreated, as described above, by slurrying in water with adjustment of the pH to about 4.4 to 4.6 followed by centrifugation. The solid protein fraction can be spray dried at low temperature to provide a protein powder containing a high content of proteins.

It has been found that the final dried protein product powder generally has a moisture content in the range of about 4% to about 7% while the final dried starch product powder generally has a moisture content in the range of about 7% to about 13%.

The invention is illustrated by, but not limited by, the following Examples:

EXAMPLE 1

Dehulled dry yellow field peas seeds (Variety: Century) having a moisture content of about 7% by weight are dry milled in an Alpine pin mill until a pea flour or powder is obtained having a particle size within the range of about 80 to 120 mesh, the flour being able to pass conveniently through a sieve of 100 mesh. This flour (20 kg) is suspended in acidulated water, made up from 79.7 kg of water and 1.25 kg of hydrochloric acid (31.45% HCl), by adding the flour portionwise to the total amount of acidulated water. The aqueous suspension or slurry so obtained is vigorously agitated and the pH of the final slurry is about 2.5 with a substantial proportion of the proteins in the pea flour having been solublized.

The aqueous slurry is then pumped into a decanter or horizontal type centrifuge, (available commercially, for example, as a Sharples Pennwalt Series P super decanter) and is subjected to centrifugation. There is thus obtained a liquid overflow Fraction 1 (75-85 kg) containing essentially soluble proteins together with some soluble sugars and some fibrous matter, and a solid underflow Fraction 2 (19-23 kg) containing essentially starch with some insoluble proteins. The said liquid Fraction 1 has a dry solids content of 6-8.5 kg and, of this, the protein proportion amounts to 4-5.2 kg. The said solid Fraction 2 has a dry solids content of 8-13 kg and, of this, the protein proportion amounts to 0.4 to 0.8 kg, the remainder being essentially starches.

The liquid overflow Fraction 1, at a pH of about 2.5, is subjected to a further centrifugation stage (DeLaval BRPX type desludger centrifuge) in order to separate essentially the solid fibrous matter from the proteins and sugars. There is thus obtaine a liquid overflow Fraction 3 (48-58 kg) and a solid underflow Fraction 4 (24-30 kg). The said Fraction 3 has a dry solids conten of 3.5 to 4.5 kg, and of this, the protein proportion amounts to 2.5-3.3 kg. The said solid Fraction 4 has a dry solids content of 4-5 kg and of this, the protein proportion amounts to 1.3-2 kg.

The said liquid Fraction 3 is then agitated and adjusted to the isoelectric point (pH about 4.4 to 4.6) by the addition of 3N aqueous sodium hydroxide. The milky appearance of the mixture indicates coagulation and precipitation of solid proteins while sugars remain substantially in solution. The mixture is separated into liquid and solid Fractions by passing it through a desludgin type of centrifuge, commercially available as a Westphalia SB80 or DeLaval BRPX 417 centrifuge. There is thus obtained a liquid overflow Fraction 5(27-33 kg) and a solid underflow Fraction 6 (18020 kg). This liquid Fraction 5 has a dry solids content of 0.85-1.4 kg and, of this, the protein proportion amounts to only 0.2-0.55 kg. The solid Fraction 6 contains essentially solid proteins and has a dry solids content of 2.8-3 kg and, of this, the protein proportion amounts to 2.2-2.5 kg.

The liquid overflow Fraction 5 contains soluble protein and soluble sugars. It is subjected to an ultrafiltration treatment in order to further separate a portion of protein from the sugars. Suitable ultrafiltration equipment, such as a Dorr Oliver type of machine having membranes with a molecular weight cut-off of about 24,000 is used to retain additional protein on the membranes thereby removing it from the dissolved sugars. This protein so retained can be added to other protein fractions and further processed.

The solid Fraction 6 is further treated, to remove possible off-flavoured sugars, by suspending it in 50 kg of water to obtaih an aqueous slurry which is then acidified carefull with hydrochloric acid in order to maintain the slurry at pH 4.5. The mixture is again subjected to centrifugation to provide a liquid overflow Fraction 7 (28-32 kg) and a solid underflow Fraction 8 (14-18 kg) as a cake of solid proteins. This cake is then adjusted to a pH of between 4.5 and 7.5 with 5N sodium hydroxide and it is then dried in a spray type dryer such as a DeLaval type dryer at a low inlet temperature (about 330-425° F) to minimize any risk of heat denaturation of the proteins. There is thus obtained a dry powder, containing a high concentration of proteins, which has little noticeable odour or flavour. This protein powder contains about 88-93% of proteins and is characterized by having high solubility at low and neutral pH aqueous conditions. This protein powder contains about 4-7% of moisture.

The solid underflow Fraction 2, mentioned above, is reslurried with 3-5 parts (40 kg) of water containing sodium hydroxide such that the aqueous slurry so obtained has a pH of about 8.5-9.5 in order to solubilize the proteins present. This slurry at pH 8.5 to 9.5 is then separated by means of a decanter or horizontal type centrifuge (Sharples Pennwalt Series P super decanter centrifuge) to provide a liquid overflow Fraction 9 (37–41 kg) containing essentially proteins and a solid underflow Fraction 10 (20–24 kg) containing essentially starches with about 1.5% soluble proteins.

The said solid Fraction 10 is combined with two parts of water (40 - 48 Kg) and the pH is adjusted to 7 by the addition of hydrochloric acid. The aqueous mixture is then subjected to centrifugation (liquid cyclones such as Dorr Clones or Bauer type liquid cyclones). There is thus obtained a liquid overflow Fraction 17 which may be discarded or alternately, because of its low solids content, may be used as make up water at some other stage in the process. The solid underflow Fraction 18 is dried in a spray type dryer to produce a starch product powder which is high in starch content, having a starch content of approximatel 98% on a dry weight basis and containing approximately 0.3 to 0.7% protein and characterized by its pure white starch nature. The starch powder contains approximately 7% to 13% of moisture. Alternately, solid Fraction 18 may be dewatered in a centrifuge such as a DeLaval decanter type or solid Fraction 18 may be dewatered by the use of a rotary vacuum filter. The resulting cake has a solid content of approximately 50-55%. This cake may then be dried in a dispersion type dryer or alternately on a mixture is centrifuged by use of a DeLaval type BRPX Desludger Centrifuge thereby providing a liquid overflow Fraction 13 (30–35 kg), having a relatively low dry solids content of 0.4–0.8 kg of which only 0.04–0.1 kg is protein, and a solid underflow Fraction 14 (11–13 kg), having a dry solids content of 1.5–2 kg which is essentially proteins, the proportion of the latter amounting to 1.3–1.6 kg.

The liquid Fraction 13, like Fraction 5 mentioned above, contains soluble proteins together with soluble sugars, and may be subjected to an ultrafiltration treatment using a Dorr Oliver type of ultrafiltration unit having membranes with a molecular weight cut-off of about 24,000. The membranes thereby retain a certain proportion of the soluble proteins while the soluble sugars pass through the membranes. The additional protein so retained can be added to other protein fractions and further processed.

The solid Fraction 14 containing essentially proteins is further treated, to improve the content of proteins therein, by resuspending it in 3–5 parts of water (37 kg) while maintaining the pH of the aqueous mixture at a figure of about 4.4 to 4.6. The aqueous suspension is subjected to centrifugation and there is thus obtained a liquid overflow Fraction 15 (36–42 kg), having a low dry solids content of 0.2–0.35 kg of which the protein proportion is only 0.04–0.08 kg; and a solid underflow Fraction 16 (9.5–11.2 kg). The latter Fraction 16 has a dry solids content of 1.4–1.8 kg which is essentially proteins (1.3–1.6 kg). This Fraction 16 is adjusted to a pH between about 4.5 and 7.5 with aqueous sodium hydroxide and it is then dried in a spray type dryer, such as a DeLaval type dryer at a low inlet temperature (about 330°–425° F). There is thus obtained a dry powder, containin a high concentration of proteins, which has little or no noticeabl odour or flavour. This concentrated protein powder differs from the powder obtained from Fraction 8 in that it has a lower solubility index, higher water absorption and a greater degree of heat coagulability than the powder prepared from Fraction 8.

EXAMPLE 2

The procedure described in Example 1 for the preparation of pea flour using yellow field peas (Century variety) was repeated. An aqueous slurry was then prepared using the pea flour (25 kg), water (99.6 kg) and hydrochloric acid (1.6 kg), the latter being commercial grade hydrochloric acid (20° Be: 31.45% HCl).

The aqueous slurry is then pumped to a screening stage where the bulk of the fibrous material is removed without losing any appreciable quantity of the proteins and starches, either in solution or in suspension. This generally is achieved by using a suitable screen size dependent upon the relative particle size of the original flour and the particle size of the fibrous material. Generally a screen size of about 100 microns is appropriate and a suitable screening device operated under pressur such as a Dorr Oliver DSM Screen, removes the fibrous material and thus leaves an aqueous slurry containing substantially all of the proteins and starches from the pea seeds.

Following the procedure described in Example 1, the first centrifugation procedure using a decanter or nozzle type centrifuge provides a liquid overflow Fraction 1 (96.5–101 kg), which is essentially proteins, having a dry solids content of 8.5–10 kg of which the proportion of proteins present therein is 5.5–6.3 kg, and a solid underflow Fraction 2 (24–28 kg), which is essentially starches with a small amount of proteins. Solid Fraction 2 has a dry solids content of 13.5–15 kg of which only 0.5–0.9 kg is protein.

The liquid Fraction 1 at pH 3 is subjected to further centrifugation using a desludger type centrifuge. Thus is thereby obtained a liquid overflow Fraction 3 (61–69 kg) having a dry solids content of 5.1–5.9 kg of which 3.4–4.0 is protein, together with a solid underflow Fraction 4 (30–37 kg), having a dry solids content of 4.8–5.4 kg of which 1.8–2.2 is protein.

Likewise, the solid Fraction 2 is treated in a similar manner to that described in Example 1. It is reslurried in water (26.9 kg) and the mixture is adjusted to a pH of about 8.5 by the addition of sodium hydroxide. By means of a decanter or horizontal type centrifuge, it is separated further into starches and proteins. There is thus obtained a liquid overflow Fraction (47.4–54.4 kg) having a dry solids content of 3.8–4.3 of which 2.1–2.8 kg is protein, and a solid underflow Fraction 6 (22–29 kg) having a dry solids content of 10.2–11 kg of which only 0.06–0.09 kg is protein.

The solid Fraction 4 and the liquid Fraction 5, both of which contain protein, are combined and the pH of the aqueous mixture is adjusted to a figure of about 8.5 by the addition of aqueous sodium hydroxide. The mixture so adjusted is subjected to centrifugation (DeLaval type) and there is thereby obtained a liquid overflow Fraction 7 (64.2–78.4 kg), having a dry solids content of 2.5–3.4 kg of which the protein proportion amounts to 1.85–2.1 kg. The corresponding solid underflow Fraction 8 (51–67 kg), has a dry solids content of 5.5–6.8 kg of which the protein proportion amounts to only 0.9–1.18 kg.

The said solid Fraction 6 has 2 parts of water (50 kg) added and the pH is adjusted to a figure of 7 by the addition of hydrochloric acid. The aqueous mixture is then subjected to centrifugation (liquid cyclone such as Dorrclones). There is thus obtained a liquid overflow Fraction 9 which may be discarded and a solid underflow Fraction 10 (41–46 kg) which is substantially starches with only minor amounts of protein. This Fraction 10 has a dry solids content of 16-17 kg and the proportion of protein therein amounts to about 0.12-0.18 kg.

Solid Fraction 10 may then be dried in a spray type dryer to produce a white powder material that is high in starch, approximately 97% and low in proteins, approximately 0.1 to 0.2% and is characterized by its white starchy nature. The dried powder has a moisture content of approximately 7% to 13%. Alternately, solid underflow Fraction 10 may be dewatered by use of a decanter centrifuge or rotary vacuum filter to provide a dryer feed stock in cake form rather than in slurry form. This cake form may be dried in fluid bed type dryers or continuous belt type dryers.

The liquid overflow Fraction 3 and 7, both of which contain substantial amounts of protein, are combined and the pH of the aqueous mixture so obtained is adjusted to a figure of about 4.4. The aqueous mixture is subjected to centrifugation by use of a desludger type of centrifuge. There is thereby obtained a liquid overflow Fraction 11 (85.5-92 kg), having a dry solids content of 3.2-3.6 kg wherein the proportion of protein is 0.9-1.2 kg, and a solid underflow Fraction 12 (41-48 kg), havin a dry solids content of 4.7-5 kg of which the protein content amounts to 4.0-4.3 kg.

The liquid Fraction 11 contains soluble proteins together with soluble sugars. It is subjected to an ultrafiltration treatment using a Dorr Oliver type of ultrafiltration unit having membranes with a molecular weight cut-off of about 24,000. The membranes thereby retain a certain proportion of the proteins while allowing some additional separation of proteins. The protein so retained can be added to other protein fractions for further processing or spray dried separately to provide a completely soluble protein powder.

The solid Fraction 12, containing a high concentration of proteins, is resuspended in water (24.6 kg) and the aqueous mixture so obtained is treated with hydrochloric acid in order to maintain the pH thereof to about 4.4. The aqueous mixture is subjected to centrifugation by means of a desludger type centrifuge. There is obtained therefrom a liquid overflow Fraction 13 (32-38 kg), having a dry solids content of 1.4-0.55 kg. of which the protein proportion amounts to 0.08-0.12 kg, and a solid. underflow Fraction 14 (28-33 kg), having a dry solids content of 4.3-4.7 kg of which the protein proportion amounts to 3.9-4.2 kg. This Fraction 14, which is almost completely proteins, is adjusted to a pH between about 4.5 and 7.5 dried in a spray type dryer, such as a DeLaval type dryer at a low inlet temperature (about 330°-425° F). There is thus obtained a dry powder, having a high concentration of proteins, which has little or no noticeable odour or flavour.

EXAMPLE 3

This example describes the wet grinding of yellow field peas to form an aqueous slurry containing dissolved proteins, sugars, solid starches and fibers and the separation therefrom of a protein powder and a starch powder.

15 Kg of split and dehulled yellow field pea seeds (split peas: variety Century) in a 59.06 kg of water containing 0.94 kg of commercial grade hydrochloric acid (20° Be; 31.45% HCl) are finely ground using a Bauer type plate grinder having a setting of 0.01-0.04 inch. The aqueous slurry so obtained has a pH of about 2.5.

This aqueous slurry is first subjected to a vibratory screening using a Sweco type screen unit to remove the bulk of the fibrous matter. There is thus obtained a liquid underflow ("throughs") Fraction 1 and a solid overflow ("ons") Fraction 2. The liquid Fraction 1 contains a dry solids content of 20-28% and the proportion of protein in that dry solids content amounts to about 31-40%. The solid Fraction 2 has a dry solids content 12-25% and the protein proportion in such dry solids content is of the other of 15-20%.

The liquid Fraction 1 is subjected to centrifugation using a decanter or desludger type centrifuge or liquid cyclone. There is thus obtained a liquid overflow Fraction 3, having a dry solids content of 8.5-10.4% of which the protein proportion amounts to 68-76%, together with a starchy solid underflow Fraction 4 having a dry solids content to 40-54% of which the protein proportion amounts to about 4-6%.

The solid Fraction 2 is reslurried with 3-5 parts of water and sufficient hydrochloric acid to provide an aqueous slurry of pH 2.5. This slurry is subjected to centrifugation using a decanter type of centrifuge. There is thus obtained a liquid overflow Fraction 5 and a solid underflow Fraction 6. The said liquid Fraction 5 has a dry solids content of 5.7-8.2% and of this dry content, the protein proportion amounts to 40-55%. Liquid Fraction 5 is returned to the beginning of the process and serves as part of the water required for the initial grinding of the split pea raw material. The said solid Fraction 6 has a dry solids content of 25-35% containing a small proportion (5-8%) of proteins, and is the fiber byproduct.

The said liquid Fraction 3 containing a high percentage of proteins, is filtered as required through rotary vacuum filters or sintered metal type filters to remove the remaining fine fibrous material Alternately desludger centrifuges may be used to remove fine solid material There is thereby obtained a clarified liquid Fraction 7 and a solid Fraction 8.

The solid Fraction 4 containing essentially starches is subjected to severe agitation and it is then resuspended in 3-5 parts of water and sodium hydroxide. This aqueous mixture has a pH of about 8.5 and it is subjected to centrifugation using a decanter centrifuge or liquid cyclone such as a Dorrclone. There is obtained a liquid overflow Fraction 14 and a solid underflow Fraction 13. This liquid Fraction 14 has a dry solids content of 4.6-7.0% and the protein proportion therein amounts to 55-65%. The solid Fraction 13 which is substantially starches has a dry solids content of 25-32% and the protein proportion therein amount to 1.8-2.6%

The aqueous mixture obtained by combining liquid Fraction 7 and 14 is adjusted to a pH of about 4.4 by the addition of hydrochloric acid. This aqueous mixture is then subjected to centrifugation using a desludger type of centrifuge to provide a liquid overflow Fraction 10 and a solid underflow Fraction 9. The said liquid Fraction 10 has a dry solids content of only 2.5-4.2% and of this, the protein proportion amounts to 34-45%. The said solid Fraction 9 is rich in proteins and has a dry solids content of 13.5-16% of which the protein proportion amounts to 81-87%.

The liquid Fraction 10 contains soluble proteins and soluble sugars. It is subjected to an ultrafiltration treatment in order to separate, and thus retain, a further portion of protein from the soluble sugars. Suitable ultrafiltration equipment, such as a Dorr Oliver type machine, having membranes with a molecular weight cut-off of about 24,000, is used to retain protein on the membranes while soluble sugars remain in solution and pass through the membranes. The. protein so obtained is added to other fractions, if desired, for further processing.

The solid Fraction 9 is resuspended in water to provide an aqueous slurry having a pH of 4.4 and the pH is maintained at that figure by adding hydrochloric acid. The mixture is subjected to centrifugation using a desludger type of centrifuge. There is thus obtained a liquid overflow Fraction 12 and a solid underflow Fraction 11. The said liquid Fraction 12 has a very low dry solids content of 0.25–0.8% and the proportion of protein therein amounts to 45–66%. The said solid Fraction 11 has a dry solids content of 12.5–15% which is essentially proteins, the protein proportion of this solid amounting to 89–93%. This solid Fraction 11 is spray dried according to the procedure described in Example 1 using a DeLaval type dryer and there is obtained a protein powder the same as Example 1 combined protein flows The solid Fraction 13 is resuspended in one part of water and the aqueous mixture thus obtained has a pH of about 7. It is subjected to centrifugation using a Dorrclone liquid cyclone and there is obtained a liquid overflow Fraction 16 and a solid underflow Fraction 15. This liquid Fraction 16 has a dry solids content of 1.5–2% and the proportion of protein therein is 10–15%. The solid Fraction 15 has a dry solids content of 28–33% and only a minor proportion of this (0.3–0.7%) amounts to protein. This solid Fraction 15 is dried in a spray type dryer. There is thus obtained a dry powder which is about 98% starches on a dry weight basis containing only about 0.3–0.7% protein and is characterized by its white starchy nature. The starch powder may contain about 7–13% of moisture.

The embodiments of the invention in which an exclusive property or privilege is claimed are defined as follows:

1. A process for the removal of fibrous material fromlegume seed which comprises slurrying finely ground or powdered dehulled legume seed in an aqueous acidic medium to provide an aqueous slu7rry thereof wherein the pH is within the range of from about 2.2 to about 3.2 subjecting said aqueous slurry to screening or filtering to remove relatively large sized fibrous material.

2. The process of claim 1 wherein the pH of the aqueous slurry is from about 2.5 to about 3.0.

3. The process of claim 1 wherein the pH of the aqueous slurry is about 2.5.

4. The process of claim 1 wherein the aqueous slurry is formed by the wet grinding of legume seed in an aqueous acid medium.

5. The process of claim 1 wherein the aqueous slurry is formed by the wet grinding of legume seed in an aqueous acid medium at a pH of from about 2.5 to about 3.0.

6. The process of claim 1 wherein the aqueous slurry is formed by the wet grinding of legume seed in an aqueous medium at a pH of about 2.5.

7. The process of claim 1 wherein the aqueous slurry contains hydrochloric acid or phosphoric acid to provide the desired pH in said aqueous slurry.

8. The process of claim 1 wherein the finely ground or powdered seed has a particle size not greater than about 120 microns.

9. The process of claim 1 wherein the temperature of the aqueous medium in which the seed is slurried is within the range of from about 15° C. to about 25° C.

10. The process of claim 1 wherein the ratio of water in said aqueous medium to the seed is from about 3:1 toa bout 10:1 by weight.

11. The process of claim 1 wherein the pH of the aqueous slurry is in the range of from about 2.5 to 3.0 and is at a temperature of from about 15° C. to about 25° C. and the ratio of the aqueous medium to seed being about 4:1.

12. The process of claim 1 wherein the aqueous slurry is formed by the wet grinding of the seed in an aqueous medium at a pH of from about 2.5 to about 3.0, at a temperature of from about 15° C. to about 25° C. and the ratio of said aqueous medium to seed is from about 3:1 to about 10:1.

13. The process of claim 1 wherein the fibrous matter thus obtained is reslurried in an aqueous acidic medium at a pH of from about 2.5 to about 3.0 and the aqueous slurry thus obtained is filtered to provide purified fibrous matter.

14. The process of claim 1 wherein said legume seed is a yellow field pea seed.

* * * * *

UNITED STATES PATENT AND TRADEMARK OFFICE
CERTIFICATE OF CORRECTION

PATENT NO. : 5,034,227
DATED : June 25, 1991
INVENTOR(S) : Gary Bruce Nickel It is certified that error appears in the above-identified patent and that said Letters Patent is hereby corrected as shown below: On the title page:

assignee from "James Richardson & Sons Limited" to --Woodstone Foods Limited--.

Signed and Sealed this

Sixteenth Day of February, 1993

*Attest:*

STEPHEN G. KUNIN

*Attesting Officer*      *Acting Commissioner of Patents and Trademarks*